(12) United States Patent
Sakai et al.

(10) Patent No.: US 6,475,635 B1
(45) Date of Patent: Nov. 5, 2002

(54) SLIDING MATERIAL MADE OF COPPER ALLOY, METHOD OF PRODUCING SAME, AND SLIDING BEARING

(76) Inventors: Kenji Sakai, c/o Daido Metal Company Ltd., 2, Sanage-cho, Kita-ku, Nagoya (JP); Naohisa Kawakami, c/o Daido Metal Company Ltd., 2, Sanage-cho, Kita-ku, Nagoya (JP); Satoru Kurimoto, c/o Daido Metal Company Ltd., 2, Sanage-cho, Kita-ku, Nagoya (JP); Takashi Inaba, c/o Daido Metal Company Ltd., 2, Sanage-cho, Kita-ku, Nagoya (JP); Koichi Yamamoto, c/o Daido Metal Company Ltd., 2, Sanage-cho, Kita-ku, Nagoya (JP); Takayuki Shibayama, c/o Daido Metal Company Ltd., 2, Sanage-cho, Kita-ku, Nagoya (JP)

( * ) Notice: Subject to any disclaimer, the term of this patent is extended or adjusted under 35 U.S.C. 154(b) by 0 days.

(21) Appl. No.: 09/734,572

(22) Filed: Dec. 13, 2000

(30) Foreign Application Priority Data

Feb. 28, 2000 (JP) .......................... 2000-051323

(51) Int. Cl.$^7$ ............................ B32B 15/20; B22F 7/00; C22C 9/02; C22C 9/06; F16C 33/12

(52) U.S. Cl. ..................... 428/553; 428/558; 428/561; 428/675; 384/13; 420/469; 420/470; 420/485; 148/536; 148/553; 148/679

(58) Field of Search ........................ 428/553, 558, 428/561, 675; 384/13; 420/469, 470, 485; 148/536, 553, 679

(56) References Cited

U.S. PATENT DOCUMENTS 5,004,581 A * 4/1991 Takagi et al. .............. 148/412
6,022,629 A * 2/2000 Rumpf et al. .............. 384/910
6,165,246 A * 12/2000 Kira et al. .................. 428/545
6,334,914 B2 * 1/2002 Sakai et al. ................. 148/433

FOREIGN PATENT DOCUMENTS

| EP | 0 273 332 | 7/1988 |
| EP | 0 962 541 | 12/1999 |
| JP | 9 49524 | 2/1997 |
| WO | 97 03298 | 1/1997 |

* cited by examiner

Primary Examiner—Deborah Jones
Assistant Examiner—Jason Savage
(74) Attorney, Agent, or Firm—Browdy and Neimark, P.L.L.C.

(57) ABSTRACT

A copper alloy sliding material which can bring about superior resistance to fatigue as well as good anti-seizure property without containing any Pb. The copper alloy sliding material is made to have the structure in which both of the hard copper alloy phase and the soft copper alloy phase coexist in a mixture state. On the surface of the sliding material, the soft copper alloy phase comes to have a shape more concave than that of the hard copper alloy phase when receiving a load or when being in a sliding wear relation, in which concave portions is retained lubricant with the result that the anti-seizure property is enhanced. Further, since the soft phase and the hard phase are made of the same copper alloy, the wettability thereof becomes good, and Ni and etc. contained in the hard copper alloy phase are diffused into the soft copper alloy phase, so that the hardness of the boundary portion defined between the phases come to be gradually varied. Thus, because of the unclear boundary, the load received in the hard phase comes to be spread in a wide range without being concentrated at the boundary, so that the fatigue strength is enhanced.

20 Claims, 4 Drawing Sheets

SLIDING MATERIAL MADE OF COPPER ALLOY, METHOD OF PRODUCING SAME, AND SLIDING BEARING

BACKGROUND OF THE INVENTION

The invention relates to a sliding material of a copper alloy in which sliding material the resistance to fatigue and the anti-seizure property thereof are enhanced, a method of producing the same, and a sliding bearing made by use of the same.

Hitherto, there is known a Kelmet bearing which is used as a copper alloy sliding material. The Kelmet bearing comprises a back metal made of a steel, a bearing alloy layer bonded to the back metal which bearing alloy layer is made of a sintered alloy containing copper and lead, and an overlay layer bonded to the Cu—Pb-based bearing alloy layer of the sintered alloy, which Kelmet bearing is used as a sliding bearing for an automobile engine etc. In the Kelmet bearing, even if the overlay layer is worn away, Pb contained in the sintered alloy containing copper and lead exists on a sliding face, so that it keeps good anti-seizure property.

In the conventional copper alloy sliding materials represented by the Kelmet bearing, the anti-seizure property thereof is enhanced by adding Pb of about 20 mass percents. However, since Pb acts to cause bad influence on the environment, it is preferred to reduce the content thereof as little as possible or to use no Pb. However, since Pb has such function as explained above, the reducing of the content of Pb make the anti-seizure property deteriorated.

Further, in recent automobile engines, there is such a tendency as the temperature and specific load of the bearing become higher due to high rotation and high output design. However, since the Kelmet bearing contains such a high amount of Pb as to be about 20 wt. % which Pb has a low melting point and which Pb is soft, the Kelmet bearing has the problems that it is low in strength and that it is inferior in the resistance to fatigue particularly under high specific load.

SUMMARY OF THE INVENTION

The invention is achieved under this situation, and the object of the invention is to obtain the copper alloy sliding material which can bring about high anti-seizure property without using any Pb while having both of good anti-seizure property and good resistance to fatigue even under a high temperature and a high specific load, the method of producing the same, and the sliding bearing made by use of the sliding material.

The inventors of the invention have found out that, by providing such structure as both of soft copper alloy phase and hard copper alloy phase are in a mixture state in the sliding material of copper alloy, the anti-seizure property and the resistance to fatigue of the copper alloy sliding material are enhanced. Namely, on the surface of the sliding material in which the soft copper alloy phase and the hard copper alloy phase coexist in a mixture state, the hard copper alloy phase and the soft copper alloy phase become convex and concave in shape, respectively, when load is applied to the surface of the sliding material. In this state, since lubricant is retained in the concave portions, the anti-seizure property of the sliding material is enhanced. The inventors of the invention have further found out that, by making the hard and soft phases satisfy the condition of (H2/H1)≧1.2 in which H1 is the Vickers hardness number of the soft copper alloy phase and in which H2 is the Vickers hardness number of the hard copper alloy phase, there occurs on these soft and hard copper alloy phases a concave and convex relation which can act as a lubricant reservoir.

Further, by making both of the soft and hard copper alloy phases coexist in the mixture state on the surface of the sliding material, the soft copper alloy phase acts to serve for the conformability of the sliding material, and the hard copper alloy phase acts to serve for the load applied to the sliding material. Usually, load borne on the hard phase acts as shearing stress at the boundary defined between the hard phase and the soft phase. However, in a case where both of the hard phase and the soft phase are formed of the same copper alloy, there occurs no clear boundary between the hard phase and the soft phase, so that the load borne on the hard phase is spread in area including the boundary between the hard and soft phases with the result that the resistance to fatigue of the sliding material is enhanced.

In view of this, according to a first aspect of the invention, the sliding material of the copper alloy has a structure in which both of the soft copper alloy phase and the hard copper alloy phase coexist in a mixture state, the Vickers hardness number of the hard copper alloy phase being not less than 1.2 times that of the soft copper alloy phase, whereby it becomes possible to obtain good conformability, superior resistance to fatigue, and superior anti-seizure property without adding any Pb.

According to a second aspect of the invention, since the copper alloy sliding material is made of a sintered alloy, the structure in which both of the soft copper alloy phase and the hard copper alloy phase coexist in a mixture state can be readily formed.

In the second aspect of the invention, the composition of the sintered alloy essentially consists, by mass, of: not more than 15% Sn; at least one kind of 0.2 to 40% in total selected from the group consisting of Ni, Co, Mn, and Fe; at least one kind of not more than 40% in total selected from the group consisting of P, Zn, Al, Ag, and Si, the total amount of the at least one kind selected from the group consisting of Ni, Co, Mn, and Fe and the at least one kind selected from the group consisting of P, Zn, Al, Ag, and Si being in the range of 0.2 to 40%; and the balance substantially Cu. The reasons for the numerical limitations disclosed above are explained below.

(a) Sn not more than 15 mass %:

Sn acts to strengthen the matrix and to enhance the resistance to fatigue. In addition, the adding of Sn enhances the anti-seizure property. In a case where the amount of Sn exceeds 15 mass %, much amount of Cu—Sn intermetallic compound occurs to make the sliding material brittle.

(b) At least one kind of element of 0.2 to 40 mass % in total selected from the group consisting of Ni, Co, Mn, and Fe:

The at least one kind of element strengthens the matrix and enhances the resistance to fatigue. Further, since it is an element which hardly migrates insofar as the sintering temperature of 800 to 920 is concerned, the at least one kind of element exists essentially in the hard copper alloy phase and acts favorably for providing hardness difference between the hard and soft copper alloy phases. In a case where the total amount of the at least one kind of element is less than 0.2 mass %, it is impossible to make the hard copper alloy phase hard in hardness. In another case where it exceeds 40 mass %, the sliding material becomes apt to adhere to a counterpart shaft, so that it causes bad influence on the anti-seizure property.

(c) At least one kind of element not more than 40 mass % in total selected from the group consisting of P, Zn, Al, Ag, and Si:

The at least one kind of element strengthens the matrix and enhances the resistance to fatigue. Further, since it is an element which readily migrate insofar as the sintering temperature of 800 to 920 is concerned, the at least one kind of element acts to strengthen the whole sliding material made of the copper alloy. In a case where the total amount thereof exceeds 40 mass %, the whole sliding material made of the copper alloy becomes excessively hard in hardness unfavorably.

(d) The total amount of both of the at least one kind of element selected from the group consisting of Ni, Co, Mn, and Fe and the at least one kind of element selected from the group consisting of P, Zn, Al, Ag, and Si, being in the range of 0.2 to 40 mass %:

In a case where the total amount of the elements selected from the two groups exceeds 40 mass %, the whole of the sliding material of the copper alloy becomes excessively hard in hardness, which is unfavorable when the sliding material is used as a bearing material.

According to a third aspect of the invention, since the at least one kind of element selected from the group consisting of Ni, Co, Mn, and Fe is contained in the hard copper alloy phase, it becomes possible to readily provide the hardness difference between the hard and soft copper alloy phases.

Unless relatively large difference in hardness is provided between the hard and soft copper alloy phases, it becomes impossible to provide the condition that the Vickers hardness number of the hard copper alloy phase is not less than 1.2 times as much as that of the soft copper alloy phase. To meet this condition, it is preferred that the at least one kind of element (, strengthening element,) for strengthening the hard copper alloy phase does not diffuse into the soft copper alloy phase. However, in a case where none of the strengthening elements is diffused into the soft copper alloy phase, there occurs excessively clear boundary between the hard and soft copper alloy phases, which is not favorable in view of the resistance to fatigue.

Regarding this respect, in a fourth aspect of the invention, the two or more kinds of copper alloy powders are mixed, or pure copper powder and at least one kind of copper alloy powder are mixed, and then the mixture is sintered, wherein the at least one kind of copper alloy powder is of such a copper alloy as to contain the at least one kind of element (Ni, Co, Mn, and/or Fe) for increasing the hardness, so that it becomes possible to readily form both of the hard copper alloy phase and the soft copper alloy phase and to readily provide a predetermined difference in hardness therebetween. In addition, in this case, since both of the hard phase and the soft phase are of the copper alloy, both of the soft phase and the hard phase are good in wettability, so that the strengthening element contained in the hard phase diffuses into the soft phase with the result that the boundary defined therebetween does not become excessively clear regarding difference in hardness.

According to a fifth aspect of the invention, a heat treatment is performed for 1 to 20 hours at a temperature of 200 to 500° C. after the final step of the sintering, so that the hardness of one kind of copper alloy phase such as, for example, Cu—Sn—Ni alloy phase increases because of the age hardening thereof while in another kind of copper alloy phase such as, for example, Cu—Sn alloy phase no age hardening occurs, whereby the difference in hardness can be readily provided between the soft copper alloy phase and the hard copper alloy phase. Further, even in a case where no age hardening occurs in the hard copper alloy phase, since the temperature of softening occurring during the heat treatment performed after the work hardening differs one copper alloy phase by one copper alloy phase, it becomes possible to make only the soft copper alloy phase soft in hardness through the heat treatment performed after the final rolling of the copper alloy by suitably selecting the compositions of the hard copper alloy phase and the soft copper alloy phase, and it is also possible to make the difference in hardness larger.

According to a sixth aspect of the invention, since the copper alloy sliding material is bonded onto the back metal to thereby form a bearing, it can be used as a sliding bearing for an automobile engine of high rotation and high output.

According to a seventh aspect of the invention, since the overlay layer made of metal and/or resin is bonded onto the surface of the sliding material of copper alloy, it becomes possible to provide a sliding bearing superior in each of initial conformability, foreign matter embeddability, and anti-seizure property.

BRIEF EXPLANATION OF THE DRAWINGS

FIGS. 3A and 3B are drawings for explaining the function of enhancing the resistance to fatigue, wherein FIG. 3A is a drawing for schematically showing the hard copper alloy phase and the soft copper alloy phase, FIG. 3B being a drawing for showing the variation of hardness along the line 3B—3B in FIG. 3A.

FIGS. 4A, 4B and 4C are drawings for explaining the function of enhancing the resistance to fatigue, wherein, FIG. 4A is a schematic drawing for showing the hard copper alloy phase and the soft copper alloy phase, FIG. 4B being a drawing for showing the variation of hardness along the line 4B—4B in FIG. 4A, FIG. 4C being a drawing schematically showing shearing stress occurring at the boundary between the hard copper alloy phase and the soft copper alloy phase.

DESCRIPTION OF THE PREFERRED EMBODIMENTS OF THE INVENTION

Figure 1:
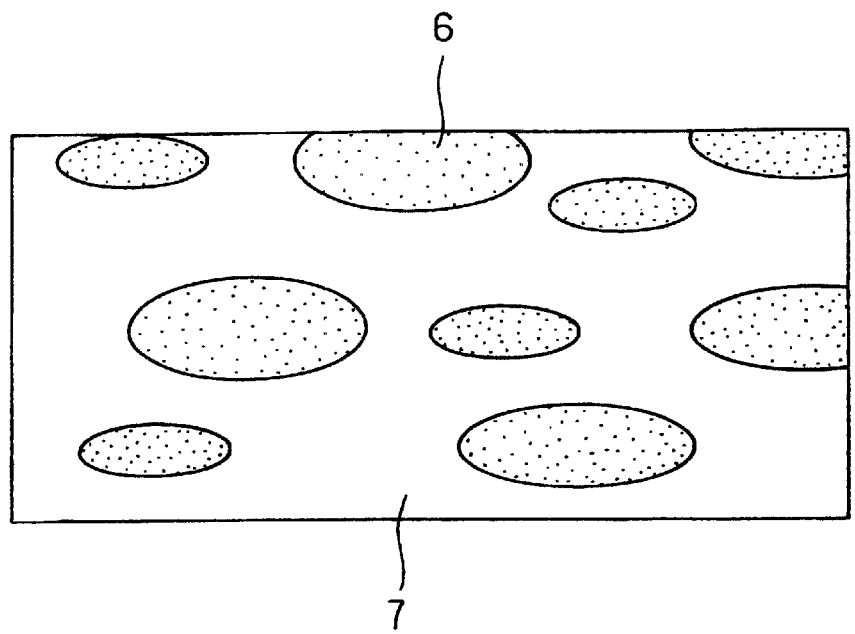
FIG. 1 is a drawing schematically showing the structure of a sliding material of one embodiment of the invention.
Figure 2:
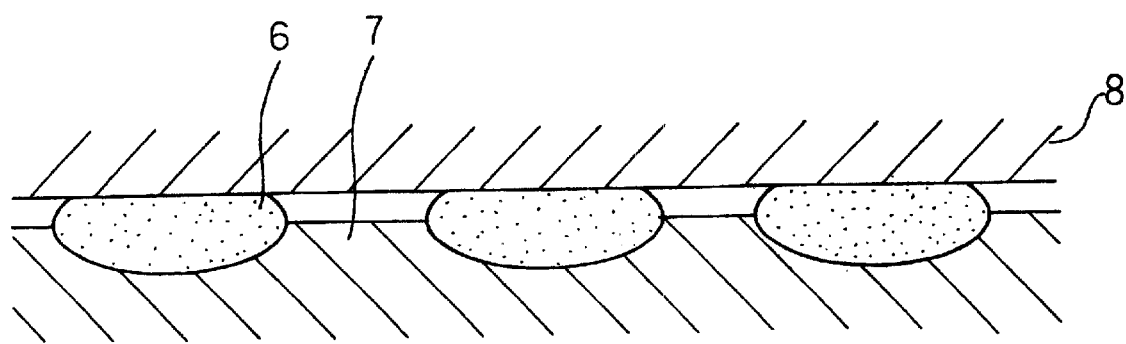
FIG. 2 is a schematic drawing corresponding to FIG. 1 for explaining the oil-retaining function.

One embodiment of the invention is described below regarding a case of applying it to an automobile engine while referring to the drawings.

Figure 5:
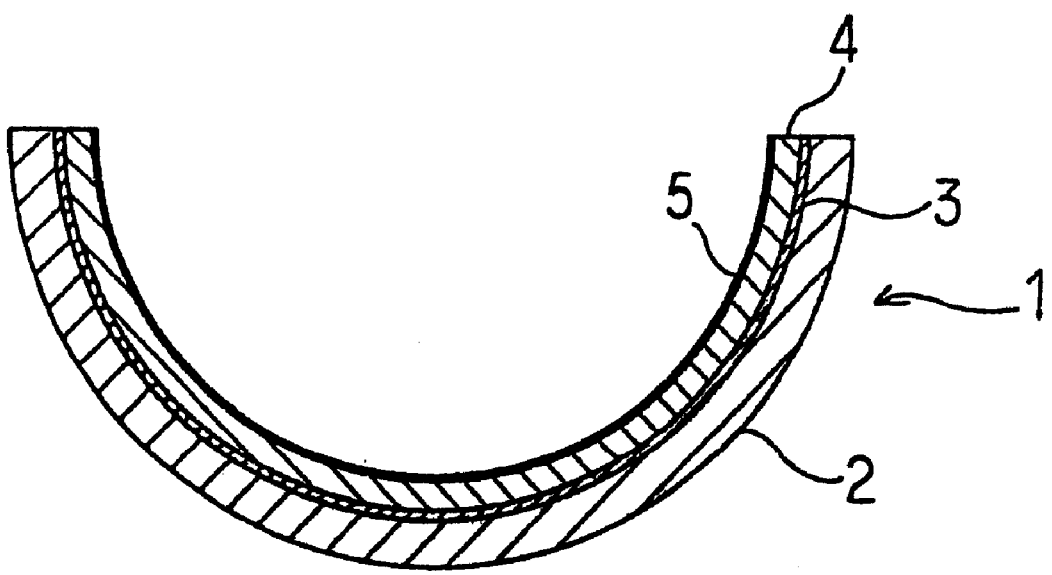
FIG. 5 is a sectional view of the half bearing.

A bearing 1 shown in FIG. 5 is called a half bearing, two of which are paired to be used as a sliding bearing for an automobile engine etc. The bearing 1 comprises a back metal 2 formed of a steel sheet of thin thickness, a bonding layer 3 made of copper-plating layer which is bonded onto the back metal 2, a layer 4 of the copper alloy sliding material (bearing alloy) according to the invention which is bonded onto the bonding layer 3, and an overlay layer 5 made of soft metal and/or resin which layer is bonded onto the layer 4 of the copper alloy sliding material.

The copper alloy sliding material is made of a sintered copper alloy consisting essentially, by mass, of: not more than 15% Sn; at least one kind of element of 0.2 to 40% in total selected from the group consisting of Ni, Co, Mn, and Fe; at least one kind of element not more than 40% in total selected from the group consisting of P, Zn, Al, Ag, and Si, the total amount of both of the at least one kind of element selected from the group consisting of Ni, Co, Mn, and Fe and the at least one kind of element selected from the group consisting of P, Zn, Al, Ag, and Si being in a range of 0.2 to 40%; and the balance substantially Cu.

Then, there is described below a method of producing the half bearing 1.

First, two or more kinds of copper alloy powder are mixed, or pure copper powder was mixed with one or more kinds of copper alloy powder. In a case of mixing the two or more kinds of copper alloy powder with each other, the at least one kind thereof is selected to be the powder of a hard copper alloy containing at least one strengthening element selected from the group consisting of Ni, Co, Mn, and Fe. In another case where the pure copper powder is mixed with the one or more kinds of copper alloy powder, the at least one kind thereof is selected to be the powder of a copper alloy containing one or more kinds of the strengthening elements defined above. The powder of the hard copper alloy may further contain at least one kind of strengthening element selected from the group consisting of P, Zn, Al, Ag, and Si. It is preferred that the particles of the copper alloy powder or of the pure copper powder have an average grain size not more than 250 µm.

The mixture powder was spread on a steel sheet with the copper plating layer, (that is, the bonding layer 3), it being then sintered in a reducing atmosphere for about 15 minutes at a temperature of 800 to 920° C., and thereafter the rolling thereof was performed. After the rolling, the sintering was performed again with the same condition as above, and then the final rolling thereof was performed, whereby there was produced a bimetal comprising the layer 4 of the copper alloy sliding material bonded on the steel sheet.

In a case where the mixture of both of the pure copper powder and the copper alloy powder (,for example, Cu—Sn—Ni alloy powder) is sintered, Sn contained in the copper alloy powder is diffused into the pure copper powder with the results that Cu—Sn alloy is formed and that Sn becomes substantially uniform in concentration over the whole of the copper alloy sliding material layer 4. Further, regarding the strengthening elements, such strengthening elements of Ni, Co, Mn, and Fe as to hardly migrate in the structure insofar as the sintering temperature of 800 to 920° C. is concerned, are hardly diffused into the pure copper powder and remain in the copper alloy powder, so that a copper alloy containing at least one of these strengthening elements becomes hard in hardness while another copper alloy containing none of these strengthening elements becomes soft in hardness.

After producing the bimetal in the manner explained above, the bimetal was cut to have a predetermined width and length, it being then worked to have a semi-cylindrical shape, the surface of the sliding material layer 4 being finished by machining, and an overlay layer 5 was bonded on the finished surface of the sliding material layer. Further, in a case where the hardness difference between the soft copper alloy phase and the hard copper alloy phase is to be made larger, a heat treatment may be performed at a temperature of 200 to 500° C. for 1 to 20 hours after the final sintering step but before providing the overlay layer 5.

FIG. 5 shows a half bearing 1 produced by the steps described above. Two pieces of the half bearing 1 are combined to become a cylindrically shaped bearing, which is used as a main bearing for a crank shaft of an automobile engine, or as a bearing for a connecting rod etc.

In the half bearing produced by the steps described above, the thickness of the back metal 2 was 1.2 mm, the thickness of the bonding layer 3 being 5 µm, the thickness of the bearing alloy layer 4 made of the copper alloy sliding material being 0.3 mm, and the thickness of the overlay layer was 10 µm.

Figure 6:
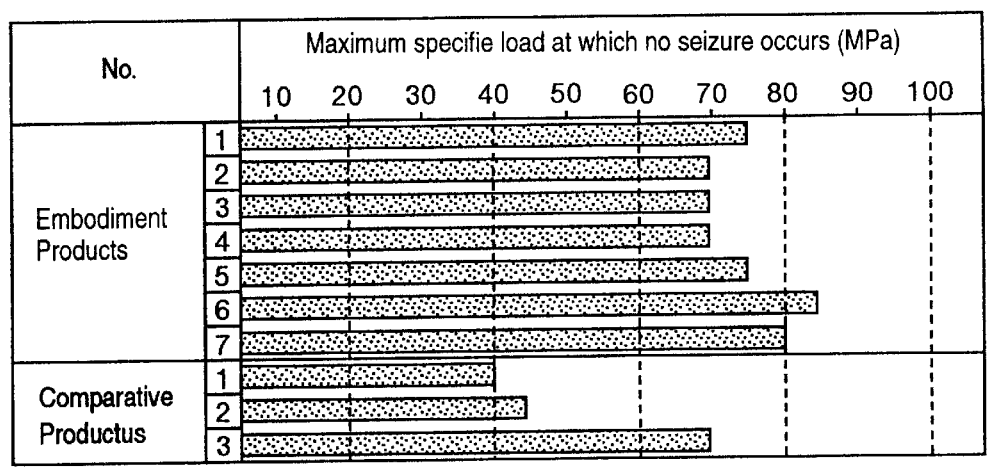
FIG. 6 is a graph showing the results of the seizure test.
Figure 7:
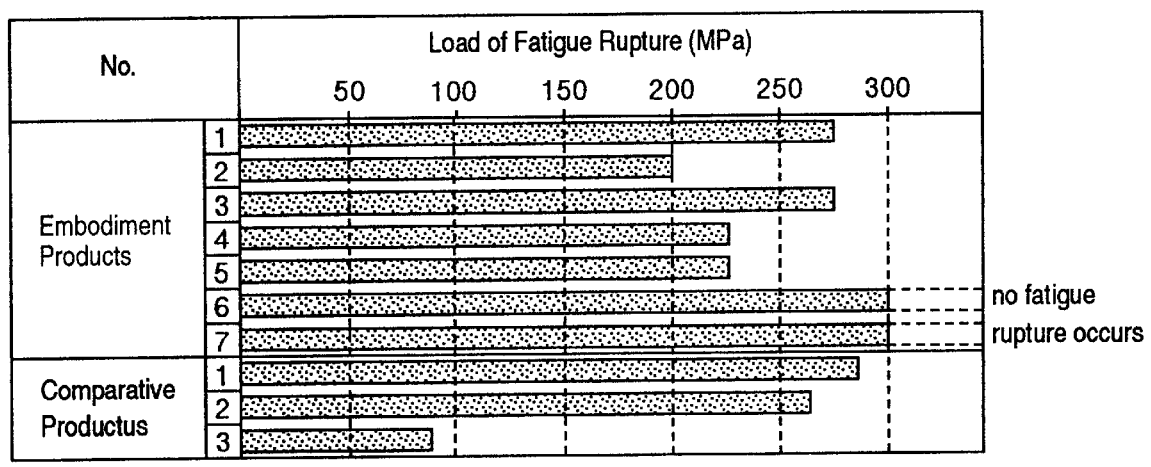
FIG. 7 is a graph showing the results of the fatigue test.

By use of the same production steps as described above, various products relating to the invention and comparative products were produced by use of the powders having the compositions disclosed in Table 1, and Vickers hardness test regarding both of the hard copper alloy phase and the soft copper alloy phase, seizure test and fatigue test regarding the products were performed. The results of the Vickers hardness test are disclosed in Table 1, the results of the seizure test and the fatigue test being disclosed in FIGS. 6 and 7, respectively. As regards the embodiment products Nos. 6 and 7, a heat treatment were performed at 350° C. for 7 hours.

In Table 1, Powder (A) and Powder (B) are metal powders mixed with each other for obtaining a powder mixture for the sintering. In the Vickers hardness test, Vickers hardness numbers were measured regarding the cross section of the products by use of micro-Vickers hardness testing machine. In Table 1, the numeral before each of the elements indicates the content (mass %) of each element.

In the seizure test, a rotating shaft driven by a motor was supported by each of bearings similar to that of FIG. 5, (however, in each of the bearings no overlay layer 5 was provided to precisely examine the characteristics of the copper alloy sliding materials used as the bearing alloy layer), running-in being performed regarding initial 60 minutes, after the running-in the specific load of the bearing being stepwise raised 5 MPa at a time by reducing the amount of lubricant, each specific load being maintained for 10 minutes, and a specific load of the bearing lower by one step than the maximum specific load which was deemed to occur at the time when the temperature of the back face of the bearing exceeded 220° C. or when the current flowing in the motor for driving the shaft became abnormal in value. Other conditions for the seizure test are shown in Table 2.

As regards the fatigue test, there were used small test pieces each made of only the copper alloy sliding material 4, onto each of which test pieces was applied test load. The test load was raised by 10 MPa at a time from the start level of 50 MPa, at each of the test load was applied the sine-wave like load of 50,000 cycles, and a test load at which a crack occurred was deemed to be the fatigue rupture load of the copper alloy sliding material.

TABLE 1

| | No. | Powder "A" Composition (mass %) | Powder "B" Composition (mass %) | Mixture ratio (mass %) Powder "A" | Powder "B" | Vickers Hardness Number H2 | H1 | H2/H1 |
|---|---|---|---|---|---|---|---|---|
| Embodi- | 1 | Cu-6Sn-10Ni | Pure Cu | 70 | 30 | 150 | 102 | 1.5 |
| ment | 2 | Cu-5Fe | Cu-6Sn | 50 | 50 | 149 | 115 | 1.3 |

TABLE 1-continued

|  | No. | Powder "A" Composition (mass %) | Powder "B" Composition (mass %) | Mixture ratio (mass %) | | Vickers Hardness Number | | |
|---|---|---|---|---|---|---|---|---|
|  |  |  |  | Powder "A" | Powder "B" | H2 | H1 | H2/H1 |
| Products | 3 | Cu-6Sn-10Ni | Cu-20Zn | 70 | 30 | 165 | 85 | 1.9 |
|  | 4 | Cu-6Sn-3Co | Pure Cu | 80 | 20 | 140 | 110 | 1.3 |
|  | 5 | Cu-6Sn-10Ni | Cu-2Sn | 50 | 50 | 158 | 110 | 1.4 |
|  | 6 | Cu-6Sn-10Ni | Pure Cu | 70 | 30 | 297 | 93 | 3.2 |
|  | 7 | Cu-10Ni | Cu-10Sn | 50 | 50 | 305 | 105 | 2.9 |
| Compara- | 1 | Cu-6Sn-10Ni | — | 100 | — | 160 | — | — |
| tive | 2 | Cu-6Sn-10Ni | Cu-5Fe | 50 | 50 | 145 | 138 | 1.1 |
| Products | 3 | Cu-3.5Sn-23Pb | — | 100 | — | 87 | — | — |

TABLE 2

| Item | |
|---|---|
| Shaft diameter | 53 mm |
| Bearing width | 13 mm |
| Pheripheral speed | 10 m/second |
| Lubricant | SAE #20 |
| Flow rate of feeded oil | 12.5 ml/minutes |
| Shaft material | S55C quenched product |
| shaft roughness | $R_{max}$ not more than 1.0 μm |

The results of the tests are analyzed as disclosed below.

Comparative Product No.3 contains such a high content of Pb as to be 23 mass %, which product corresponds to the conventional Kelmet bearing. In comparing Comparative Product No.3 with each of Embodiment Products Nos. 1 to 7, although each of Embodiment Products Nos. 1 to 7 has anti-seizure property equivalent to or slightly higher than that of Comparative Product No.3, the resistance to fatigue of each of Embodiment Products Nos. 1 to 7 is remarkably superior to that of Comparative Product No.3. Since each of Embodiment Products Nos. 1 to 7 contains no Pb, it is superior regarding the resistance to fatigue. Even in a case where it is used for an automobile engine of high rotation and high output, the good anti-seizure property of each of Embodiment Products Nos. 1 to 7 is maintained while the resistance to fatigue thereof is remarkably improved.

The reasons why each of Embodiment Products Nos. 1 to 7 has the anti-seizure property equivalent to or slightly higher than that of the Kelment bearing while having the resistance to fatigue remarkably superior to that of the Kelment bearing are supposed to reside in the respects explained below. First, regarding the anti-seizure property, as apparent from the structure of each of Embodiment Products Nos. 1 to 7, it has a state in which both of the hard copper alloy phase 6 and the soft copper alloy phase 7 coexist in a mixture state as apparent in FIG. 1 schematically showing this mixture structure. In the case where both of the hard copper alloy phase 6 and the soft copper alloy phase 7 coexist in the mixture state, the soft copper alloy phase comes to have a concave shape when it receives a load or when it is in a sliding wear relation to a counterpart shaft 8 with the result that lubricant comes to be retained in the portions of the concave shape, whereby the anti-seizure property is improved.

For example, in comparing Embodiment Product No.1 with Comparative Product No. 1, the anti-seizure property of Embodiment Product No.1 is remarkably superior to that of Comparative Product No.1. In this case, although both of these Products are produced by use of, as the basic material thereof, the same copper alloy powder of the Cu—Sn—Ni alloy (hard), in Embodiment Product No.1 the pure copper powder (soft) is mixed thereto and is sintered. Thus, in Embodiment Product No.1, there occurs a state where both of the hard copper alloy phase and the soft copper alloy phase coexist in the mixture state, which makes the hardness thereof uneven. However, since Comparative Product No.1 is produced by use of only Cu—Si—Ni powder, the hardness thereof is substantially uniform. Thus, in Embodiment Product 1 having the uneven hardness, the soft copper alloy phase 7 comes to be concave in shape to thereby retain the lubricant. However, in Comparative Product No.1 having the substantially uniform hardness, no concave shape occurs, which makes it impossible to bring about oil-retaining function with the result that the anti-seizure property thereof becomes inferior to that of Embodiment Product No.1.

As regards the hardness difference between the hard copper alloy phase and the soft copper alloy phase which hardness difference is required for obtaining the lubricant-retaining function brought bout from the concave, soft copper alloy phase, the present inventors have found out that the lubricant-retaining function can be obtained when achieving (H2/H1)≧1.2 in which H1 is the Vickers hardness number of the soft copper alloy phase 7 and in which H2 is the Vickers hardness number of the hard copper alloy phase 6. For example, in Embodiment Product No.2 and Comparative Product No.2, although each of the materials of both of them contains Cu—Fe powder of 50 mass %, in Comparative Product No. 2 the hardness ratio (H2/H1) of the hard copper alloy phase and the soft copper alloy phase is less than 1.2. Thus, although Embodiment Product No.2 has the same level of anti-seizure property as that of the conventional Kelmet bearing (Comparative Product No.3), in Comparative Product No. 2, the degree of the concavity is small to make the oil-retaining function thereof low, which makes the anti-seizure property thereof inferior.

Next, the reasons why each of Embodiment Products Nos. 1 to 7 has remarkably superior resistance to fatigue are explained below. In general, in a case where both of a hard phase and a soft phase coexist in the mixture state on the surface of a sliding material, the soft phase serves to provide conformability, and the hard phase serves to bear a load. The load borne by the hard phase acts as a shearing stress occurring at the boundary defined between the hard phase and the soft phase, as shown in FIG. 4C, and the boundary to which the shearing stress is applied repeatedly becomes the initiation point of the fatigue with the result that crack occurs.

Figure 3A:
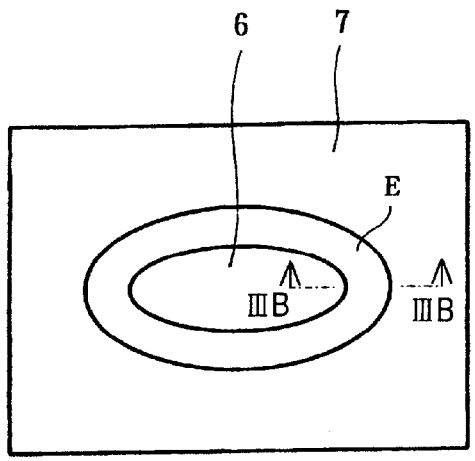
Figure 4A:
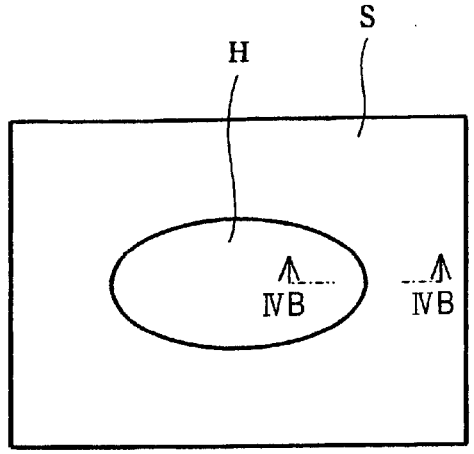
Figure 3B:
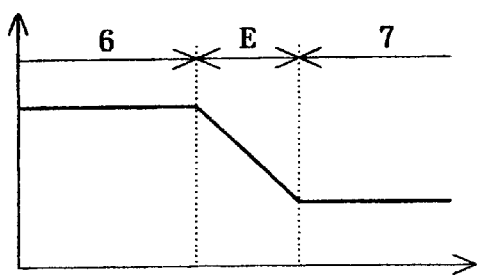
Figure 4B:
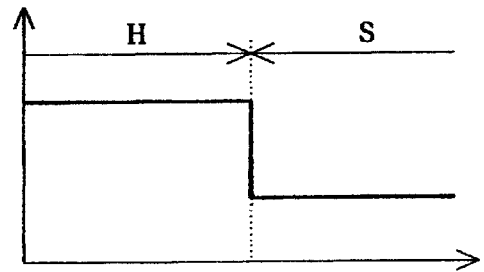
Figure 4C:
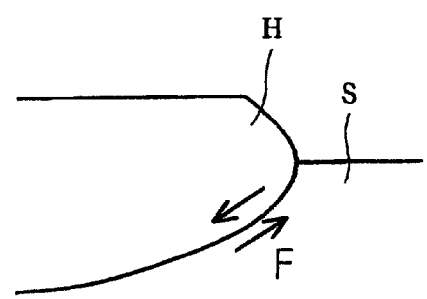

In this case, when the hardness is varied abruptly at the boundary defined between the hard phase (H) and the soft phase (S) as shown in FIG. 4B, the boundary becomes clear between the hard phase (H) and the soft phase (S), at which clear boundary the shearing stress is concentrated to thereby cause premature fatigue. However, in each of Embodiment Products Nos. 1 to 7, since each of the hard phase 6 and the soft phase 7 is made of a copper alloy, the wettability between the hard copper alloy phase and the soft copper alloy phase become good, and the strengthening elements such as Ni and Fe existing in the hard copper alloy phase are diffused although the amount of the diffused strengthening elements are small, so that, at the boundary portion between both of the copper alloy phases, the content of the strengthening elements is gradually decreased from the hard copper alloy phase 6 to the soft copper alloy phase 7. As the result thereof, at the boundary portion between the hard copper alloy phase 6 and the soft copper alloy phase 7, the hardness is varied not abruptly but gradually as shown in FIG. 3B, that is, no clear boundary comes to exist between both of the phases. Because of this, the load borne by the hard copper alloy phase 6 comes to be spread in an area shown by a letter (E) in FIG. 3A, so that the resistance to fatigue is enhanced.

By the way, by mixing pure Cu power, pure Sn powder and pure Ni powder or by mixing Cu—Sn alloy powder with pure Ni powder and then by sintering the powder mixture, some of conventional sintered products come to have structure similar to that of the products embodying the invention. However, in the case of this mixing and sintering for producing the conventional products, it is hard for Cu to completely diffuse into Ni powder, so that the center portion of each of Ni particles comes to become pure Ni or comes to have a high Ni concentration. Ni and Fe (such as steel or cast iron) which is a representative material of a counterpart shaft are apt to cause adhesion, so that the conventional products are inferior in the anti-seizure property. Further, in the case of sintering the mixture of the pure Cu power, the pure Sn powder and the pure Ni powder, Sn becomes a liquid phase at an initial stage because of its low melting point and diffuses into Cu and Ni particles, however, during this diffusion course, such hard, brittle compounds as to be Cu—Sn intermetallic compounds or Ni—Sn intermetallic compounds are apt to occur, which causes bad influence on the resistance to fatigue.

However, since in the invention Ni is added in the form of the Cu—Sn—Ni alloy powder, there does not occur any fear that Ni concentration becomes high locally, with the result that adhesion to a counter part shaft hardly occurs, whereby the anti-seizure property can be enhanced. In addition, since in the invention there is no fear of the occurrence of any Cu—Sn intermetallic compounds or any Ni—Sn intermetallic compounds, there occurs no bad influence on the resistance to fatigue. In view of this, each of the powders (other than the pure Cu powder) to be sintered are required to be made of the alloy containing the strengthening elements.

Further, as explained above, unless substantial difference in hardness exists between the hard copper alloy phase 6 and the soft copper alloy phase 7, the anti-seizure property is not enhanced. In strengthening elements, since each element of Mn, Co, Ni and Fe hardly migrates at a sintering temperature of 800 to 920° C., this element acts favorably when providing substantial difference in hardness between the hard copper alloy phase 6 and the soft copper alloy phase 7. Namely, among the strengthening elements, the elements which readily migrate are diffused during the sintering from the hard copper alloy phase to the soft copper alloy phase, so that the hardness of the soft copper alloy phase is raised while the hardness of the hard copper alloy phase is lowered, with the result that the difference in hardness becomes small between these phases. Regarding each of Mn, Co, Ni and Fe which hardly migrates, the migration thereof into the soft copper alloy phase is small during the sintering with the result that the hardness of the hard copper alloy phase is maintained, whereby it has such an effect as to make the hardness ratio of the hard copper alloy phase to the soft copper alloy phase be not less than 1.2.

As understandable from the comparison between Embodiment Product No.1 and Embodiment Product No. 6, both of the anti-seizure property and the resistance to fatigue are further enhanced when the difference in hardness is raised between the hard copper alloy phase 6 and the soft copper alloy phase 7. In order to further raise the difference in hardness between both of the phases 6 and 7, it is preferred to perform a heat treatment after the step of the final sintering. Each of Embodiment Products Nos.1 and 6 has the same composition and the same mixing ratio of Powder "A" (Cu—6Sn—10Ni) to Powder "B" (pure Cu), Embodiment Product No. 6 differs from Embodiment Product No. 1 in that Embodiment Product No. 6 is subjected to the heat treatment (at 350° C. for 7 hours) after the final rolling. By the above sintering, Sn contained in Powder "A" acts with pure Cu contained in Powder "B" to thereby form Cu—Sn alloy.

Although Cu—Sn—Ni alloy has the property of age hardening, the Cu—Sn alloy has no property of age hardening. Thus, since in Embodiment Product No. 6 the age hardening of the Cu—Sn—Ni alloy which is the hard copper alloy phase occurs with the result that the hardness of the Cu—Sn—Ni alloy is raised with the difference in hardness between both of the phases increasing. As the result thereof, the hardness ratio of the hard copper alloy phase 6 to the soft copper alloy phase 7 with respect to Embodiment Product No.6 is raised up to 3.2, however, the hardness ratio thereof regarding Embodiment Product No. 1 is 1.5 which is lower than the former value. In Embodiment Product No. 6 having the larger hardness ratio of the hard copper alloy phase 6 to the lower copper alloy phase 7, the anti-seizure property thereof is enhanced and the resistance to fatigue thereof is remarkably enhanced, in comparison with Embodiment Product No.1.

By the way, the sliding material of the invention is not limited to the embodiments disclosed above and in the drawings. For example, it is not limited to the use for automobile engines, but can be varied variously in the scope of the appended claims.

What is claimed is:

1. A sliding material made of a copper alloy, said copper alloy comprising a soft copper alloy phase, and a hard copper alloy phase, said soft and hard copper alloy phases satisfying a relation of (H2/H1)≧1.2, in which H1 and H2 are Vickers hardness numbers of the soft copper alloy phase and the hard copper alloy phase, respectively.

2. A sliding material according to claim 1, wherein the copper alloy is a sintered alloy consisting, by mass, of: not more than 15% Sn; at least one kind of 0.2 to 40% in total selected from the group consisting of Ni, Co, Mn, and Fe; at least one kind of not more than 40% in total selected from the group consisting of P, Zn, Al, Ag, and Si, the total amount of both of said at least one kind selected from the group consisting of Ni, Co, Mn, and Fe and said at least one kind selected from the group consisting of P, Zn, Al, Ag, and Si being in a range of 0.2 to 40%; and the balance substantially Cu.

3. A sliding material according to claim 2, wherein said hard copper alloy phase contains said at least one kind selected from the group consisting of Ni, Co, Mn, and Fe.

4. A sliding material according to claim 1, wherein said hard copper alloy phase contains said at least one kind selected from the group consisting of Ni, Co, Mn, and Fe.

5. A method of producing a sliding material made of a copper alloy, said copper alloy comprising a soft copper alloy phase, and a hard copper alloy phase, said soft and hard copper alloy phases satisfying a relation of $(H2/H1) \geq 1.2$, in which H1 and H2 are Vickers hardness numbers of the soft copper alloy phase and the hard copper alloy phase, respectively, said method comprising the steps of mixing at least two kinds of copper alloy powder with each other or mixing pure copper powder with at least one kind of copper alloy powder, and sintering the powder mixture.

6. A method according to claim 5, wherein the copper alloy is a sintered alloy consisting, by mass, of: not more than 15% Sn; at least one kind of 0.2 to 40% in total selected from the group consisting of Ni, Co, Mn, and Fe; at least one kind of not more than 40% in total selected from the group consisting of P, Zn, Al, Ag, and Si, the total amount of both of said at least one kind selected from the group consisting of Ni, Co, Mn, and Fe and said at least one kind selected from the group consisting of P, Zn, Al, Ag, and Si being in a range of 0.2 to 40%; and the balance substantially Cu.

7. A method according to claim 6, wherein said hard copper alloy phase contains said at least one kind selected from the group consisting of Ni, Co, Mn, and Fe.

8. A method according to claim 7, said method further comprising the step of performing, after the sintering step, a heat treatment at a temperature of 200 to 500° C. for 1 to 20 hours.

9. A method according to claim 6, said method further comprising the step of performing, after the sintering step, a heat treatment at a temperature of 200 to 500° C. for 1 to 20 hours.

10. A method according to claim 5, wherein said hard copper alloy phase contains said at least one kind selected from the group consisting of Ni, Co, Mn, and Fe.

11. A method according to claim 10, said method further comprising the step of performing, after the sintering step, a heat treatment at a temperature of 200 to 500° C. for 1 to 20 hours.

12. A method according to claim 5, said method further comprising the step of performing, after the sintering step, a heat treatment at a temperature of 200 to 500° C. for 1 to 20 hours.

13. A sliding bearing comprising a back metal, and a sliding material layer bonded to the back metal optionally through a bonding layer, said sliding material layer is made of a sliding material made of a copper alloy, said copper alloy comprising a soft copper alloy phase, and a hard copper alloy phase, said soft and hard copper alloy phases satisfying a relation of $(H2/H1) \geq 1.2$, in which H1 and H2 are Vickers hardness numbers of the soft copper alloy phase and the hard copper alloy phase, respectively.

14. A sliding bearing according to claim 13, wherein the copper alloy is a sintered alloy consisting, by mass, of: not more than 15% Sn; at least one kind of 0.2 to 40% in total selected from the group consisting of Ni, Co, Mn, and Fe; at least one kind of not more than 40% in total selected from the group consisting of P, Zn, Al, Ag, and Si, the total amount of both of said at least one kind selected from the group consisting of Ni, Co, Mn, and Fe and said at least one kind selected from the group consisting of P, Zn, Al, Ag, and Si being in a range of 0.2 to 40%; and the balance substantially Cu.

15. A sliding bearing according to claim 14, wherein said hard copper alloy phase contains said at least one kind selected from the group consisting of Ni, Co, Mn, and Fe.

16. A sliding bearing according to claim 15, further comprising an overlay layer bonded to the sliding material layer which overlay layer is made of metal and/or resin.

17. A sliding bearing according to claim 14, further comprising an overlay layer bonded to the sliding material layer which overlay layer is made of metal and/or resin.

18. A sliding bearing according to claim 13, wherein said hard copper alloy phase contains said at least one kind selected from the group consisting of Ni, Co, Mn, and Fe.

19. A sliding bearing according to claim 18, further comprising an overlay layer bonded to the sliding material layer which overlay layer is made of metal and/or resin.

20. A sliding bearing according to claim 13, further comprising an overlay layer bonded to the sliding material layer which overlay layer is made of metal and/or resin.

* * * * *

UNITED STATES PATENT AND TRADEMARK OFFICE
CERTIFICATE OF CORRECTION

PATENT NO.    : 6,475,635 B1
DATED         : November 5, 2002
INVENTOR(S)   : Sakai et al.

It is certified that error appears in the above-identified patent and that said Letters Patent is hereby corrected as shown below:

<u>Title page,</u>
Item [76], insert:

-- [73]  Assignee:   Daido Metal Company Ltd., Nagoya, Japan --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,475,635 B1
DATED : November 5, 2002
INVENTOR(S) : Kenji Sakai et al.

It is certified that error appears in the above-identified patent and that said Letters Patent is hereby corrected as shown below:

<u>Title page,</u>
Item [73], Assignee, "Daido Metal Company Ltd., Nagoya, Japan" (as inserted by Certificate of Correction issued March 18, 2003) should be deleted. The Certificate of Correction was erroneously issued and should be vacated.

Signed and Sealed this

Fourteenth Day of October, 2003

JAMES E. ROGAN
*Director of the United States Patent and Trademark Office*